United States Patent
Kagan et al.

(10) Patent No.: US 11,681,047 B2
(45) Date of Patent: Jun. 20, 2023

(54) GROUND SURFACE IMAGING COMBINING LIDAR AND CAMERA DATA

(71) Applicant: Argo AI, LLC, Pittsburgh, PA (US)

(72) Inventors: Asaf Kagan, Herzliya (IL); Dana Berman, Tel Aviv (IL); Guy Leibovitz, Tel Aviv (IL); Matthew Lee Gilson, Pittsburgh, PA (US); Rotem Littman, Hod Hasharon (IL)

(73) Assignee: ARGO AI, LLC, Pittsburgh, PA (US)

( * ) Notice: Subject to any disclaimer, the term of this patent is extended or adjusted under 35 U.S.C. 154(b) by 627 days.

(21) Appl. No.: 16/720,795

(22) Filed: Dec. 19, 2019

(65) Prior Publication Data
US 2021/0190956 A1    Jun. 24, 2021

(51) Int. Cl.
*G01S 17/894* (2020.01)
*B60R 11/04* (2006.01)
*G06T 7/73* (2017.01)

(52) U.S. Cl.
CPC .......... *G01S 17/894* (2020.01); *B60R 11/04* (2013.01); *G06T 7/73* (2017.01); *B60R 2300/301* (2013.01);
(Continued)

(58) Field of Classification Search
CPC . G06T 2207/10028; G06T 2207/30252; G06T 2207/20221; G06T 2207/30236;
(Continued)

(56) References Cited

U.S. PATENT DOCUMENTS

| 8,290,305 B2 | 10/2012 | Minear et al. |
| 2011/0282578 A1 | 11/2011 | Miksa et al. |

(Continued)

FOREIGN PATENT DOCUMENTS

KR    20190134303 A    12/2019

OTHER PUBLICATIONS

Wulff, Florian, et al. "Early fusion of camera and lidar for robust road detection based on U-Net FCN." 2018 IEEE Intelligent Vehicles Symposium (IV). IEEE, 2018. (Year: 2018).*

(Continued)

*Primary Examiner* — Vincent Rudolph
*Assistant Examiner* — Raphael Schwartz
(74) *Attorney, Agent, or Firm* — Fox Rothschild LLP (57) ABSTRACT

A system uses data captured by vehicle-mounted sensors to generate a view of a ground surface. The system does this by receiving digital image frames and associating a location and pose of the vehicle that captured the image with each digital image frame. The system will access a three dimensional (3D) ground surface estimation model of the ground surface, select a region of interest (ROI) of the ground surface, and select a vehicle pose. The system will identify digital image frames that are associated with the pose and also with a location that corresponds to the ROI. The system will generate a visual representation of the ground surface in the ROI by projecting ground data for the ROI from the ground surface estimation model to normalized 2D images that are created from the digital image frames. The system will save the visual representation to a two-dimensional grid.

16 Claims, 7 Drawing Sheets
(1 of 7 Drawing Sheet(s) Filed in Color)

(52) U.S. Cl.
CPC ... *B60R 2300/303* (2013.01); *B60R 2300/307* (2013.01); *B60R 2300/60* (2013.01); *G06T 2207/30244* (2013.01); *G06T 2207/30252* (2013.01)

(58) Field of Classification Search
CPC .......... G06T 2207/30256; G06V 20/56; G06V 20/58; G06V 20/588; G06V 2201/08
See application file for complete search history.

(56) References Cited

U.S. PATENT DOCUMENTS

| | | |
|---|---|---|
| 2017/0039436 A1* | 2/2017 | Chen .................. G06T 7/44 |
| 2017/0277197 A1 | 9/2017 | Liao et al. |
| 2019/0228571 A1 | 7/2019 | Atsmon |
| 2019/0304197 A1 | 10/2019 | Sisbot |

OTHER PUBLICATIONS

Zhang, Hengrun et al., "Lane-level Orthophoto Map Generation using Multiple Onboard Cameras", Proceedings of the 2014 IEEE International Conference on Robotics and Biomimetics, Dec. 5-10, 2014.

Rapo, Lauri, "Generating Road Orthoimagery Using a Smartphone", Master's Thesis, 2018.

* cited by examiner

GROUND SURFACE IMAGING COMBINING LIDAR AND CAMERA DATA

BACKGROUND

Autonomous vehicles (AVs) rely on accurate maps to navigate, and to make decisions while navigating, in an environment. The AV's maps need to be refreshed with high frequency in order to be kept up to date. AVs typically use a combination of two-dimensional (2D) map data and three-dimensional (3D) map data. The 2D map data such as roads, lanes and the like may be annotated on top of a birds-eye view of the ground surface, both for ease of use and for ease of annotation.

Existing technology to create 2D images for a map is usually based on aerial imaging or satellite imaging. However, obtaining such data with high resolution and refreshing it with high frequency is very expensive. Data collected from vehicle cameras and light detection and ranging (LiDAR) systems can also be used to create such maps, since it is relatively cheaply and frequently collected during each vehicle drive. However, using raw LIDAR data or camera images may be cumbersome for mapping functions such as lane detection and drivable area annotation due to occlusions, limited field of view and loss of resolution at long ranges.

This document describes methods and systems that are directed to addressing the problems described above, and/or other issues.

SUMMARY

In various embodiments, a system that includes a processor generates a view of a ground surface from data captured by one or more vehicle-mounted sensors. The system does this by receiving digital image frames containing images of a ground surface. The digital image frames will be captured by one or more cameras that are mounted on one or more vehicles. The system will associate a location and a pose of the vehicle that captured the image with each of the digital image frames, wherein the location and pose for each digital image frame represent a position and orientation of the vehicle when the digital image frame was captured. The system will save the digital image frames, along with their associated locations and poses, to a data store. The system will access a ground surface estimation model that comprises a model of the ground surface as represented in three dimensional (3D) ground data. The system will select a region of interest (ROI) of the ground surface, and it will also select a first pose from the poses in the data store. The system will identify, from the digital image frames in the data store, a set of digital image frames that are associated with the first pose and that are associated with a location that corresponds to the ROI. The system will generate a normalized two-dimensional (2D) image from the identified set of digital image frames. The system will generate a visual representation of the ground surface in the ROI by projecting ground data for the ROI from the ground surface estimation model to the normalized 2D image. The system will then save the visual representation to a two-dimensional grid.

In various embodiments, the system may capture the 3D ground data from one or more vehicle-mounted LiDAR systems, develop the 3D ground data by processing other types of imaging data, receive the 3D ground data from an external server, or obtain the 3D ground data by other means.

Optionally, when projecting the ground data for the ROI to the normalized 2D image, the system may, for each of multiple 3D ground points for the ROI, project the 3D ground point to a pixel of the normalized 2D image. Alternatively or in addition, when projecting the ground data for the ROI to the normalized 2D image, the system may classify pixels of the normalized 2D image to determine which of the pixels of the normalized 2D image belong to a ground surface class, and it may only project the 3D ground points to pixels of the normalized 2D image that belong to the ground surface class.

Optionally, the system may select one or more additional poses from the poses in the data store. For each additional pose, the system may: (i) identify an additional set of digital image frames in the data store that are associated with the additional pose and that are associated with a location corresponding to the ROI; (ii) generate an additional normalized 2D image from the identified set of digital image frames; and (iii) develop an additional visual representation of the ground surface in the ROI by projecting ground data for the ROI from the ground surface estimation model to the additional normalized 2D image. In addition, the system may use each of the determined visual representations to assign a single RGB value to each ground point. If so, then when projecting the ground data for the ROI to the normalized 2D image the system may, for each of multiple 3D ground points in the ground data for the ROI, project the single RGB value for the ground point to a pixel of the normalized 2D image. In addition, for each ground point, when assigning the single RGB value to the ground point the system may incrementally create a weighted average of multiple candidate RGB values using a quality metric. In some embodiments, the quality metric may be a function of: (a) distance from a center of the normalized 2D image to the pixel to which the single RGB value for the ground point was projected; and (b) distance from the ground point to a location of the vehicle when the relevant digital image frame was captured. Further, for each pixel of the normalized 2D image to which a single RGB value is projected, the system may use histogram matching to match the single RGB value for the ground point of the pixel to an RGB values of the same ground point in a raster map.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

This document describes a method and system that will create a birds-eye view of a ground surface by stitching multiple camera images from multiple viewpoints and from multiple time frames, and optionally from multiple vehicles, such that each region in the final image is formed from images in which it was most clearly viewed (i.e., relatively unoccluded and in relatively high resolution).

Figure 1:
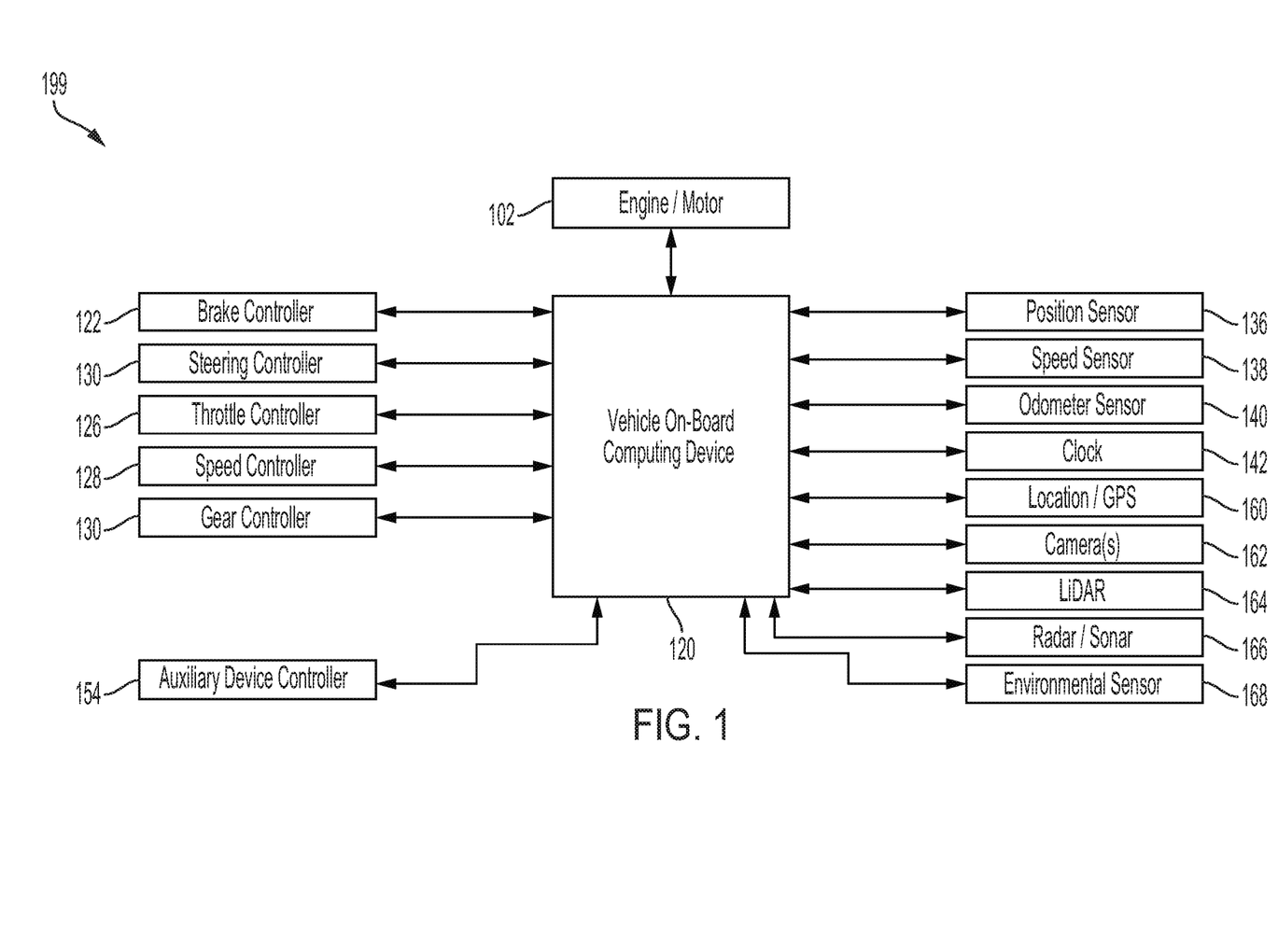
FIG. 1 illustrates example systems and components of an autonomous vehicle.

FIG. 1 illustrates an example system architecture 100 for a vehicle, such as an AV. The vehicle includes an engine or motor 102 and various sensors for measuring various parameters of the vehicle and/or its environment. Operational parameter sensors that are common to both types of vehicles include, for example: a position sensor 136 such as an accelerometer, gyroscope and/or inertial measurement unit; a speed sensor 138; and an odometer sensor 140. The vehicle also may have a clock 142 that the system uses to determine vehicle time during operation. The clock 142 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 160 such as a global positioning system (GPS) device; object detection sensors such as one or more cameras 162; a LiDAR sensor system 164; and/or a radar and or and/or a sonar system 166. The sensors also may include environmental sensors 168 such as a precipitation sensor and/or ambient temperature sensor. The object detection sensors may enable the vehicle to detect objects that are within a given distance range of the vehicle 100 in any direction, while the environmental sensors collect data about environmental conditions within the vehicle's area of travel.

During operations, information is communicated from the sensors to an on-board computing device 120. The on-board computing device 120 analyzes the data captured by the sensors and optionally controls operations of the vehicle based on results of the analysis. For example, the on-board computing device 120 may control braking via a brake controller 122; direction via a steering controller 124; speed and acceleration via a throttle controller 126 (in a gas-powered vehicle) or a motor speed controller 128 (such as a current level controller in an electric vehicle); a differential gear controller 130 (in vehicles with transmissions); and/or other controllers.

Geographic location information may be communicated from the location sensor 160 to the on-board computing device 120, which may then access a map of the environment that corresponds to the location information to determine known fixed features of the environment such as streets, buildings, stop signs and/or stop/go signals. Captured images from the cameras 162 and/or object detection information captured from sensors such as a LiDAR system 164 is communicated from those sensors) to the on-board computing device 120. The object detection information and/or captured images may be processed by the on-board computing device 120 to detect objects in proximity to the vehicle 100. In addition or alternatively, the AV may transmit any of the data to an external server for processing. Any known or to be known technique for making an object detection based on sensor data and/or captured images can be used in the embodiments disclosed in this document In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Figure 2:
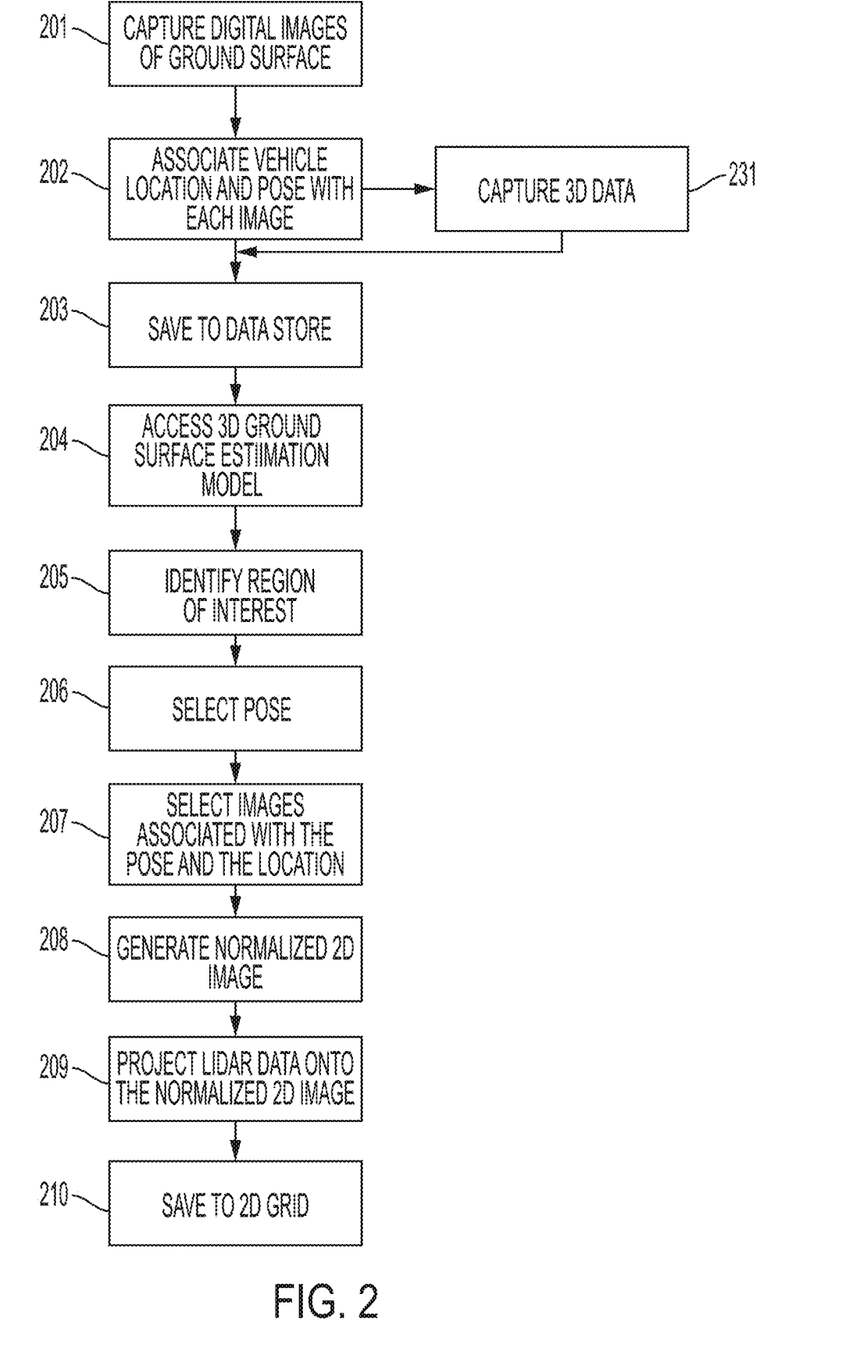
FIG. 2 is a flow diagram illustrating a method of generating a 2D representation of a ground surface.

FIG. 2 is a flow diagram illustrating various steps of a ground surface imaging process. At 201, An AV or other vehicle that is equipped with one or more cameras will capture digital image frames of a ground surface as the vehicle moves about an environment. Optionally, multiple camera-equipped vehicles may capture the images. At 202, the vehicle's image capture system or another processor that is on the vehicle or on a remote server that receives the images from the vehicle will associate a location and a pose of the vehicle with each of the digital image frames. The location and pose for each digital image frame represent a position (geographic location, and orientation) of the vehicle when the digital image was frame captured. The system may receive the location and pose information from any appropriate data source, such as the vehicle's GPS and position sensors (see FIG. 1).

At 203, the system will save the digital image frames, along with their associated locations and poses to a data store. The data store may be a memory device on the vehicle, or an external memory device that is in electronic communication with one or more of the vehicle's on-board processors.

At 204, the system will access a ground surface estimation model. The ground surface estimation model is a model of the ground surface for the environment as represented in 3D data. For example, the system may generate a ground surface estimation model, represented in a 3D frame of reference, from data captured by the vehicle's LiDAR system and/or the LiDAR systems of other vehicles. The vehicle's LiDAR system(s) may capture the LiDAR data that makes up the ground surface estimation model concurrently while the vehicle's cameras are capturing the digital images of the environment (at 231). Other 3D data sets may be used, such as 3D data captured by stereo cameras, data generated by analysis of 2D images by 3D model generation methods such as structure from motion (SfM) image processing, or other 3D data sets. Any of these data sets may be captured by the vehicle. Alternatively, the system may access an available, previously generated ground surface estimation model that is stored in a data store that is accessible to the vehicle's on-board processor(s), whether stored on the vehicle or accessible from a remote server via a communication network. The system may sample the ground surface estimation model at a regular grid having a desired resolution. The result can be represented as a raster with height values, and also as a mesh.

At 205 the system will select a region of interest (ROI) of the ground surface. The System may select an ROI based on any suitable criteria for a given situation. For example, if the vehicle is driving along a road, the ROI may be a region of the road that is directly in front of the vehicle, up to a specified distance. The specified distance may be selected, for example, as a threshold beyond which the captured data may suffer from low resolution, resulting in low image quality.

At 206, the system will then select one of the poses that are stored in the data store. At 207 the system will identify, from the digital image frames in the data store, a set of digital image frames that are associated with the first pose and that are associated with a location corresponding to the ROI. The pose may be the current pose of the vehicle, a pose that the vehicle is expected to exhibit at a particular period of time, or another pose meeting other criteria. At 208, the system will then generate a normalized two-dimensional (2D) image from the identified set of digital image frames. The system may do this using known processes such as auto white balance, auto brightness/contrast, and other correction methods.

At 209, the system will project the ground data for the ROI from the ground surface estimation model—to the normalized 2D image, thus generating a visual representation of the ground surface in the ROI. The system will save the visual representation to a two-dimensional grid at 210.

To understand how the system may project the ground grid LiDAR data to the normalized 2D image, consider the following steps:

Let:

$x' = (x, y, z, 1)$ be the homogeneous coordinates of the 3D ground point;

$y' = (u, v, 1)$ be the homogeneous coordinates of the projected point in the camera image $$P = \begin{pmatrix} f_u & 0 & c_u & -f_u b_x \\ 0 & f_v & c_v & 0 \\ 0 & 0 & 1 & 0 \end{pmatrix}$$

be the camera projection matrix (where $b_x$ is the baseline with respect to the camera, $f_u$ and $f_v$ are the horizontal and vertical focal lengths, and $c_u$ and $c_v$ are the horizontal and vertical principal point offsets);

$$T_{ground}^{cam} = \begin{pmatrix} R_{ground}^{cam} & t_{ground}^{cam} \\ 0 & 1 \end{pmatrix}$$

be the transformation matrix between the ground data and the camera frames of reference $R_{ground}^{cam}$ be the rotation matrix between the ground data and the camera(s) frame(s) of reference;

$t_{ground}^{cam}$ be the rotation matrix between the ground data and the camera(s) frame(s) of reference;

$$T_{pose} = \begin{pmatrix} R_{pose} & t_{pose} \\ 0 & 1 \end{pmatrix}$$

be the transformation matrix between the frame of reference of the ground surface and the aligned pose of the vehicle at the time the image was captured);

$R_{pose}$ be the rotation matrix between the frame of reference of the ground surface and the aligned pose of the vehicle at the time the image was captured; and $t_{pose}$ be the rotation matrix between the frame of reference of the ground surface and the aligned pose of the vehicle at the time the image was captured.

In view of the data above, then $y' = PT_{ground}^{cam} T_{pose} x'$ describes the projection of the 3D ground point to a pixel in the 2D image. In order to assign an RGB value to each ground point, the system may project the 3D ground point to the 2D image using the above projection method, and use the RGB value of the target 2D pixel to obtain the required data. Because multiple 2D images may be collected from different poses and viewpoints and from different times, the system may combine all available RGB values from all possible target pixels into a mean, median or average value, or select a different representative value and assign that value to the ground point. Methods of selecting this value will be described in more detail below.

The process described above (steps 206-209) may be repeated for multiple available poses in the ROI.

Figure 3A:
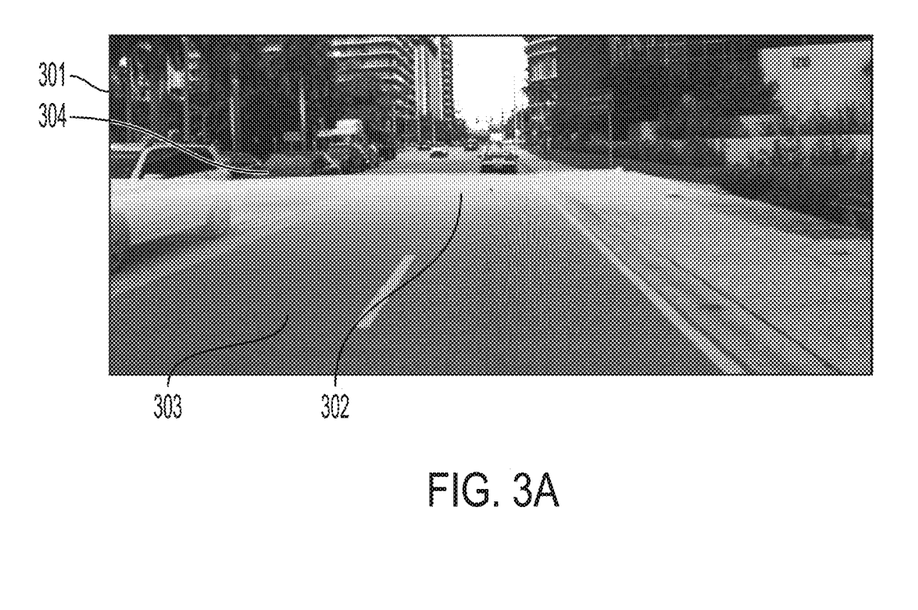
FIG. 3A illustrates an example 2D image captured by a vehicle camera, with ground points projected onto it.
Figure 3B:
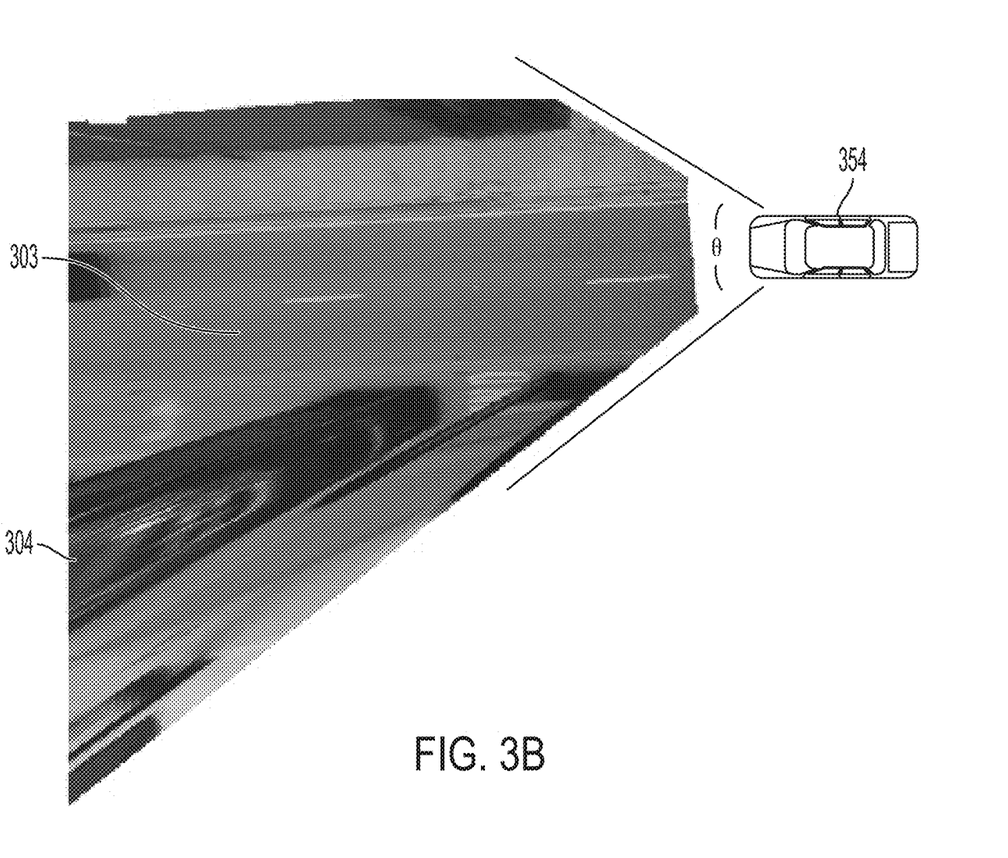
FIG. 3B illustrates the 2D image of FIG. 3A converted to a birds-eye view.

In some situations, rather than projecting ground points to every available pixel in an image, the system may first filter out pixels that are not pixels showing an image of the ground surface. For example, referring to FIG. 3A, an example 2D image with ground points projected onto it is shown. The 2D image 301 is the view of a street as taken by a camera mounted on the front of the vehicle. The ground points 302 are projected up to a distance away from the vehicle after which resolution will be relatively low. FIG. 3B illustrates a birds-eye (top-down) view of the 2D image of FIG. 3A, in which the camera's field of view (denoted by the lines extending at angle θ from vehicle 354 limits the boundaries of the image. In addition, it is notable that points in the image that are located relatively further from the vehicle 354 have a resolution that is less than that of points that are located relatively closer to the vehicle 354. In FIGS. 3A and 3B, it is apparent that the 2D image of the ground surface 302 may be occluded by one or more occlusions 304 such as other vehicles, pedestrians, or other objects.

Figure 4A:
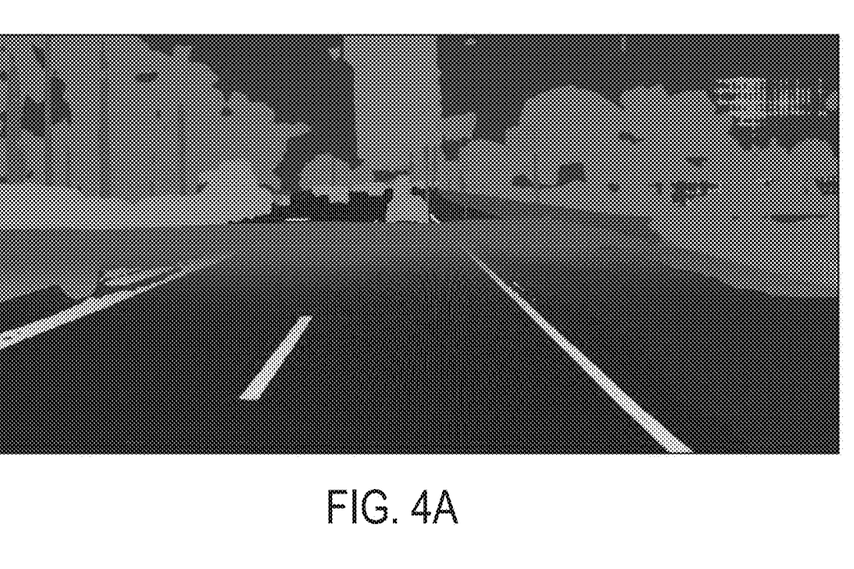
FIGS. 4A and 4B illustrate how the system may classify pixels in a 2D image as ground surface pixels or non-ground surface pixels, and then project the 3D ground grid only to the ground surface pixels.
Figure 4B:
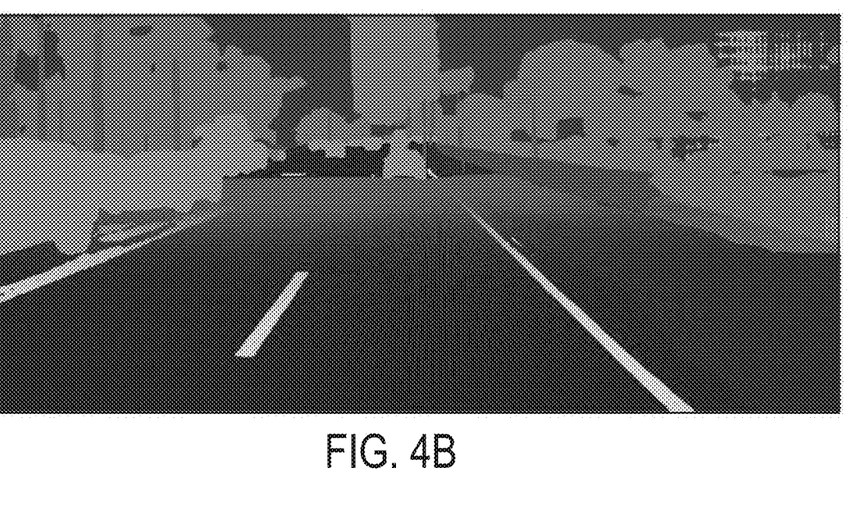

To avoid projecting the 3D ground grid onto 2D image pixels that are occluded and thus may or may not be over the ground surface, the system may apply a classifier to classify pixels in the normalized 2D image and determine which of the pixels belong to a ground surface class (as opposed to another class such as vehicle, pedestrian, bicycle, or other object class). Many classification algorithms are known and could be used for this process. For example, the system may use a semantic segmentation network (such as DeepLabV3+, PSPNet, or ResNet 38) to obtain a semantic class for each pixel. Whichever network is used, it may have been trained on a data set of various ground surfaces (such as road, sidewalk, lane markings, terrain such as grass or dirt, etc.). Referring to FIG. 4A, the results of classification use the color dark purple to represent ground surface pixels within the camera field of view such as road and sidewalk, lane markings in yellow, and non-ground-surface pixels in other colors. (The colors used in FIG. 4A and the other figures discussed below are by way of example only; other colors may be used in practice.) Then, rather than applying the 3D ground grid to all pixels in the field of view (as in FIG. 4A, with the ground grid shown in red), FIG. 4B illustrates that the system will only apply the 3D ground grid to pixels that are classified as ground, not pixels that are non-ground-surface pixels.

Figure 5A:
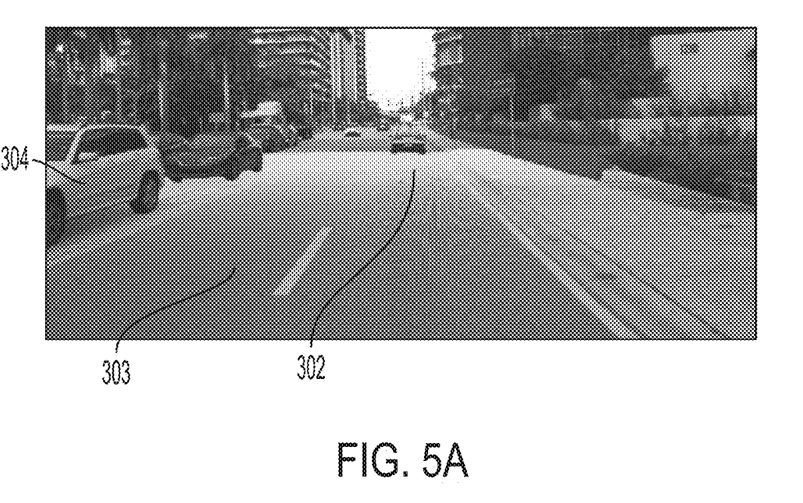
FIG. 5A illustrates how the image of FIG. 3A would appear when the ground grid is only projected onto ground surface pixels.
Figure 5B:
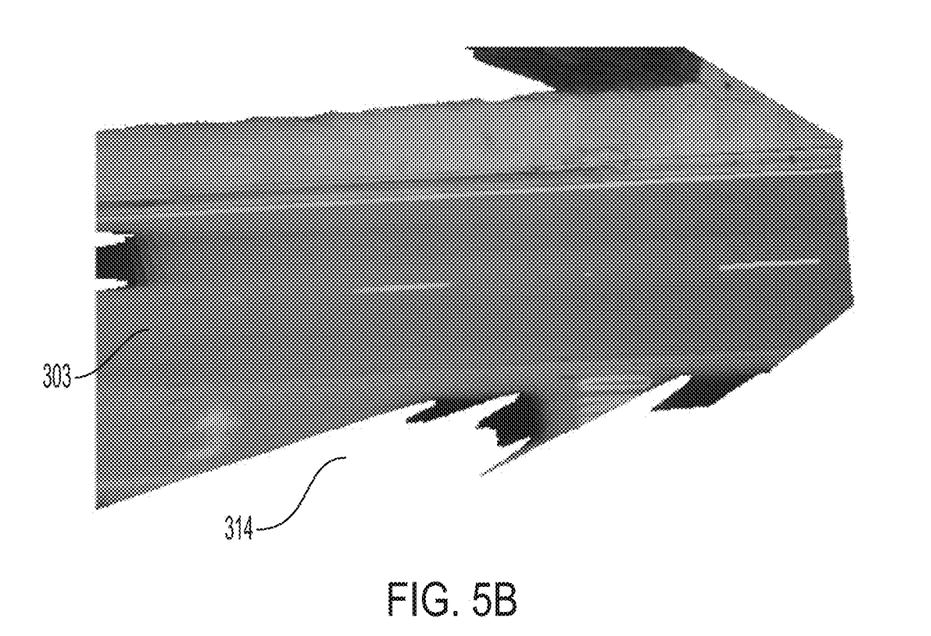
FIG. 5B illustrates the 2D image of FIG. 5A converted to a birds-eye view, which also corresponds to FIG. 3B but with non-ground surface pixels filtered out.

FIG. 5A illustrates that after the filtering step, the projected 3D ground grid 302' will only appear over the ground surface 303 and not on any occlusions 304. (This can also be illustrated by comparing FIG. 5A with FIG. 3A, where the ground grid is projected onto all pixels regardless of classification). FIG. 5B illustrates the projection as a birds-eye view. Comparing FIG. 5B with FIG. 3B, it is apparent that the occlusions do not appear in FIG. 5B.

Since a vehicle may include multiple cameras, and ground surface images will be taken from multiple locations, the system may stitch several visual representations together to generate a complete ground surface image (minus the holes that are apparent in FIG. 5B, by way of example). However, when doing this, as noted above a single ground point may be assigned multiple candidate RGB values. The system may then use any of multiple ways to assign a single RGB value for each ground point.

In some embodiments, the system may take several considerations into account when doing this. First, the selected RGB values should be the ones with the relatively high quality (such as being assigned to pixels in images in which the pixels have a relatively high resolution) as compared to others. Second, when taking RGB values from multiple frames for adjacent ground points, the system may try to reduce or avoid stitching artifacts caused by different lighting conditions or warping.

To address the issue of RGB quality, the system incrementally creates a weighted average of the multiple possible RGB values using a quality metric to determine the weight for each one. The system may store a raster map of RGB values for each ground point. For each camera image that the system processes, the system calculates a quality metric for each projected ground point. The system may then perform alpha blending between any existing RGB value for that ground point in the raster map and the newly proposed RGB value from the projected point in the current frame, using the quality metric score as alpha. In this way, the system can process image frames sequentially and keep updating the ground RGB raster map.

The system may calculate the quality metric in one of several different ways. One example process takes into account two factors: (1) the pixel coordinate in the image plane (assuming that the image is sharper closer to the center of the frame, due to lens distortion compensation which often reduces sharpness at the edges, and thus a pixel having a relatively closer distance to the center will have a higher quality metric than a pixel having a relatively higher distance to the center); and (2) the distance from the vehicle to the ground surface coordinates (closer points have a higher resolution compared to further points). With these factors in mind, the system may calculate image quality as:

Quality=$1/(D_{image} * D_{point})$, where:

$D_{point}$ is the distance from the ground point to the vehicle location;

$$D_{image} = \lambda_{image}\left(\frac{|u - w/2|^\gamma}{w/2}\right) + (1 - \lambda_{image});$$

$\lambda_{image}$ is the weighting factor (between 0 and 1) given to the horizontal distance from the image center;

w is the image width;

u is the pixel location on the x axis; and $\gamma$ is an exponent factor which controls the effect of the distance from the image center.

Other quality metrics may be used, such as saturation, distance from semantic segmentation edges, and other metrics.

In order to help avoid stitching artifacts caused by different lighting in different frames, the system may use histogram matching to match the projected pixels in the current frame to the RGB values of the same ground points already in the raster map. Warping artifacts may be reduced or avoided by using accurate calibration matrices in the projection process.

Figure 6:
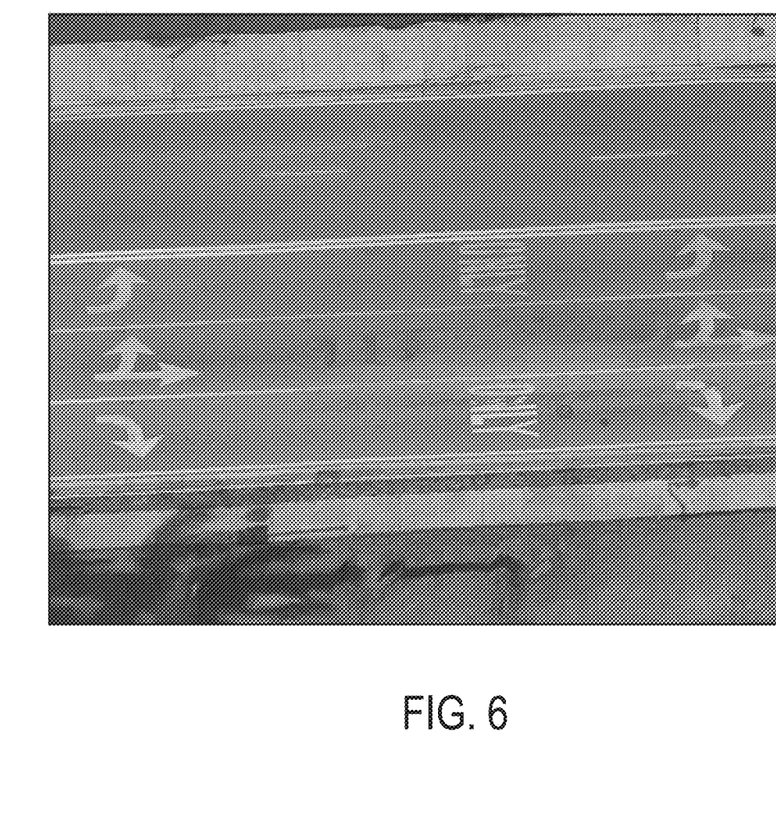
FIG. 6 illustrates a resulting birds-eye view image created by stitching multiple images such as that shown in FIG. 5B.

At the end of the process, once the system has processed the relevant images, the resulting RGB raster map is the final ground image. This process also helps to provide an RGB value for every ground point that is viewable from any of the camera images. FIG. 6 illustrates an example birds-eye view of the ground surface of FIG. 5B, as generated from multiple digital image frames.

FIG. 6 depicts an example of internal hardware that may be included in any of the electronic components of the system, such as internal processing systems of the vehicle, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors to perform the functions described in the context of the previous figures.

Figure 7:
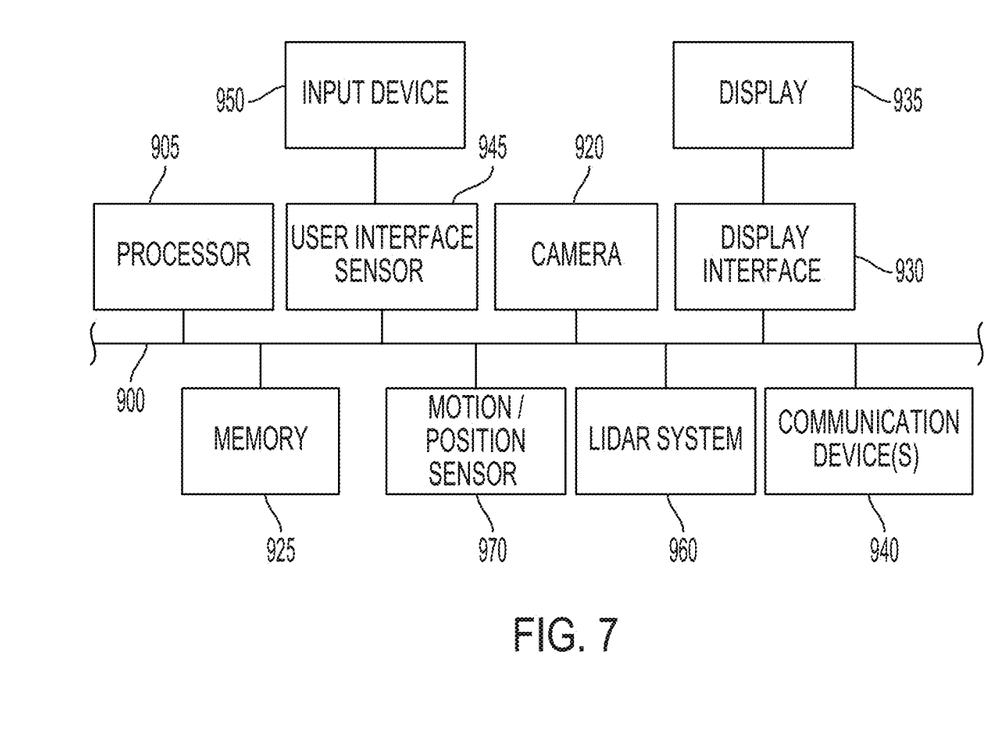
FIG. 7 is a block diagram that illustrates various elements of a possible electronic subsystem of a vehicle and/or external electronic device.

An optional display interface 930 may permit information from the bus 900 to be displayed on a display device 935 in visual, graphic or alphanumeric format, such on an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit. The system also may receive data from a LiDAR system 960 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the term "mounted" may be used to refer to sensors or other components that are attached to, held within, or positioned on a vehicle.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated. In addition when items are described as "relatively" different to another item (such as a relatively shorter distance or relatively longer distance), the term of relativeness indicates that the items are to be compared to each other.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method of generating a view of a ground surface, the method comprising:
   capturing, from one or more cameras mounted on a vehicle, digital image frames containing images of a ground surface;
   associating a location and a pose of the vehicle with each of the digital image frames, wherein the location and pose for each digital image frame represent a position and orientation of the vehicle when the digital image frame was captured;
   saving the digital image frames with associated locations and poses to a data store;
   accessing a ground surface estimation model that comprises a model of the ground surface as represented in three dimensional (3D) ground data;
   selecting a region of interest (ROI) of the ground surface;
   selecting, from the poses in the data store, a first pose;
   identifying, from the digital image frames in the data store, a set of digital image frames that are associated with the first pose and that are associated with a location that corresponds to the ROI;
   generating a normalized two-dimensional (2D) image from the identified set of digital image frames;
   generating a visual representation of the ground surface in the ROI by projecting ground data for the ROI from the ground surface estimation model to the normalized 2D image;
   saving the visual representation to a two-dimensional grid;

selecting, from the poses in the data store, one or more additional poses; and for each additional pose:
- identifying an additional set of digital image frames in the data store that are associated with the additional pose and that are associated with a location corresponding to the ROI,
- generating an additional normalized 2D image from the identified set of digital image frames, and
- developing an additional visual representation of the ground surface in the ROI by projecting ground data for the ROI from the ground surface estimation model to the additional normalized 2D image; and using each of the determined visual representations to assign a single RGB value to each ground point, wherein assigning the single RGB value to the ground point comprises incrementally creating a weighted average of multiple candidate RGB values using a quality metric;

wherein projecting the ground data for the ROI to the normalized 2D image comprises, for each of a plurality of 3D ground points in the ground data for the ROI, projecting the ground point to a pixel of the normalized 2D image.

2. The method of claim 1, wherein projecting the ground data for the ROI to the normalized 2D image comprises, for each of a plurality of 3D ground points for the ROI, projecting the 3D ground point to a pixel of the normalized 2D image.

3. The method of claim 2, wherein, for each of the 3D ground points in the ground data for the ROI, projecting the 3D ground point to a pixel of the normalized 2D image comprises assigning an RGB value to the 3D ground point.

4. The method of claim 2, wherein projecting the ground data for the ROI to the normalized 2D image further comprises:
- classifying a plurality of pixels of the normalized 2D image to determine which of the pixels of the normalized 2D image belong to a ground surface class; and
- only projecting the 3D ground points to pixels of the normalized 2D image that belong to the ground surface class.

5. The method of claim 1 further comprising, for each pixel of the normalized 2D image to which a single ground point is projected, using histogram matching to match the single RGB value for the ground point of the pixel to an RGB value of the same ground point in a raster map.

6. The method of claim 1, wherein the quality metric comprises a function of:
- distance from a center of the normalized 2D image to the pixel to which the single RGB value for the ground point was projected; and
- distance from the ground point to a location of the vehicle when the relevant digital image frame was captured.

7. The method of claim 1 wherein the capturing, from one or more cameras mounted on a vehicle, digital image frames of a ground surface comprises capturing the digital image frames from cameras mounted on a plurality of vehicles.

8. The method of claim 1, further comprising, by a LiDAR system of the vehicle, capturing the ground data.

9. A system for generating a view of a ground surface, the method comprising:
- one or more vehicle-mounted cameras;
- a processor; and
- a memory containing programming instructions that are configured to cause the processor to:
  - receive, from the one or more vehicle-mounted cameras, digital image frames containing images of a ground surface,
  - for each of the digital image frames, associate a location and a pose with the digital image frame, wherein the location and pose for each digital image frame represent a position and orientation of a vehicle from which the digital image frame was captured at the time that the digital image frame was captured,
  - save the digital image frames with associated locations and poses to a data store,
  - access a ground surface estimation model that comprises a model of the ground surface as represented in three dimensional (3D) ground data,
  - select a region of interest (ROI) of the ground surface,
  - select, from the poses in the data store, a first pose,
  - identify, from the digital image frames in the data store, a set of digital image frames that are associated with the first pose and that are associated with a location that corresponds to the ROI,
  - generate a normalized two-dimensional (2D) image from the identified set of digital image frames,
  - generate a visual representation of the ground surface in the ROI by projecting ground data for the ROI from the ground surface estimation model to the normalized 2D image, and
  - save the visual representation to a two-dimensional grid,
  - select, from the poses in the data store, one or more additional poses, and for each additional pose:
    - identify an additional set of digital image frames in the data store that are associated with the additional pose and that are associated with a location corresponding to the ROI;
    - generate an additional normalized 2D image from the identified set of digital image frames; and
    - develop an additional visual representation of the ground surface in the ROI by projecting ground data for the ROI from the ground surface estimation model to the additional normalized 2D image, and
  - use each of the determined visual representations to assign a single RGB value to each ground point, wherein the instructions to assign the single RGB value to the ground point comprise instructions to incrementally create a weighted average of multiple candidate RGB values using a quality metric;
  - wherein the instructions to project the ground data for the ROI to the normalized 2D image comprise instructions to, for each of a plurality of 3D ground points in the ground data for the ROI, project the ground point to a pixel of the normalized 2D image.

10. The system of claim 9, further comprising:
a vehicle-mounted LiDAR system, and
wherein the ground data has been captured by the vehicle-mounted LiDAR system.

11. The system of claim 9, further comprising:
a remote server, and
wherein the ground data has been received from the remote server.

12. The system of claim 9, wherein the programming instructions that are configured to cause the processor to project the ground data for the ROI to the normalized 2D image comprise:
instructions to, for each of a plurality of 3D ground points for the ROI, project the 3D ground point to a pixel of the normalized 2D image.

13. The system of claim 12, wherein the programming instructions that are configured to cause the processor to, for each of the 3D ground points in the ground data for the ROI, project the 3D ground point to a pixel of the normalized 2D image comprise instructions to assign an RGB value to the 3D ground point.

14. The system of claim 12, wherein the programming instructions that are configured to cause the processor to project the ground data for the ROI to the normalized 2D image further comprise instructions to:
 classify a plurality of pixels of the normalized 2D image to determine which of the pixels of the normalized 2D image belong to a ground surface class; and
 only project the 3D ground points to pixels of the normalized 2D image that belong to the ground surface class.

15. The system of claim 9 further comprising additional programming instructions that are configured to cause the processor to, for each pixel of the normalized 2D image to which a ground point is projected, use histogram matching to match the single RGB value for the ground point of the pixel to an RGB value of the same ground point in a raster map.

16. The system of claim 9, wherein the quality metric comprises a function of:
 distance from a center of the normalized 2D image to the pixel to which the single RGB value for the ground point was projected; and
 distance from the ground point to a location of the vehicle when the relevant digital image frame was captured.

\* \* \* \* \*